Sept. 12, 1939.   H. C. EDWARDS   2,172,556

FUEL INJECTOR

Filed June 24, 1937

INVENTOR.
Herbert C. Edwards
by Carrot Carrot Gravely
HIS ATTORNEYS.

Patented Sept. 12, 1939

2,172,556

UNITED STATES PATENT OFFICE 2,172,556

FUEL INJECTOR

Herbert C. Edwards, Massillon, Ohio, assignor to The Timken Roller Bearing Company, Canton, Ohio, a corporation of Ohio Application June 24, 1937, Serial No. 150,029

6 Claims. (Cl. 299—107.6)

This invention relates to fuel injectors, particularly hydraulically operated fuel injectors for internal combustion engines of the Diesel type. It has for its principal objects to provide a simple and efficient fuel injector of the pin nozzle type that will relieve the spring-loaded plunger valve thereof of strains that tend to bow said valve, to provide for accurately centering the valve guide in the nozzle and the valve pin in the discharge orifice thereof, to prevent dribble from the nozzle, and to provide for better atomization of the fuel. The invention consists in the fuel injector and in the construction, combinations and arrangements of parts hereinafter described and claimed.

In the accompanying drawing, which forms part of this specification and wherein like symbols refer to like parts wherever they occur.

Figure 1:
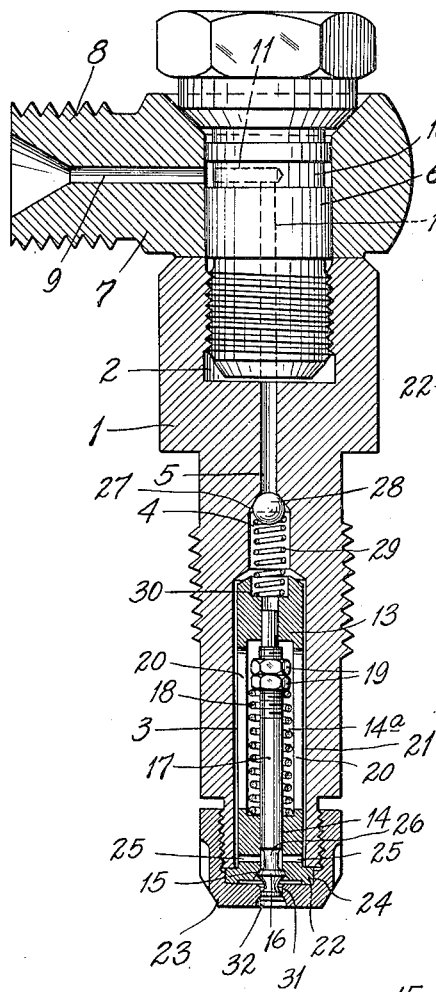
Figure 2:
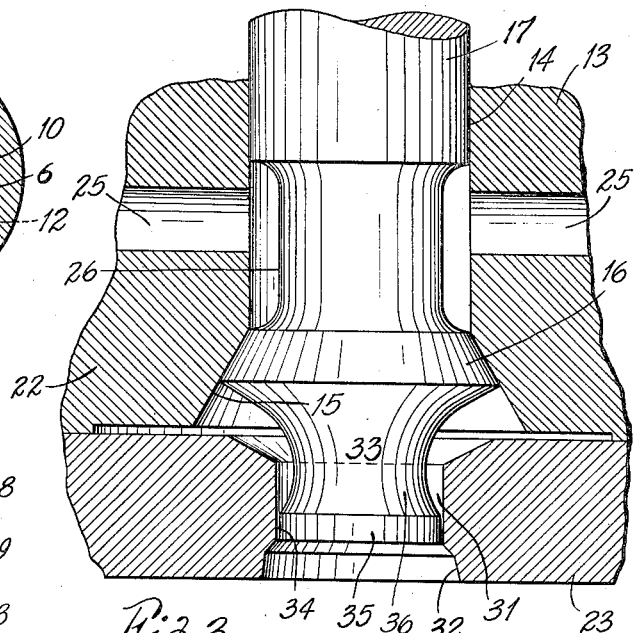
Figure 3:
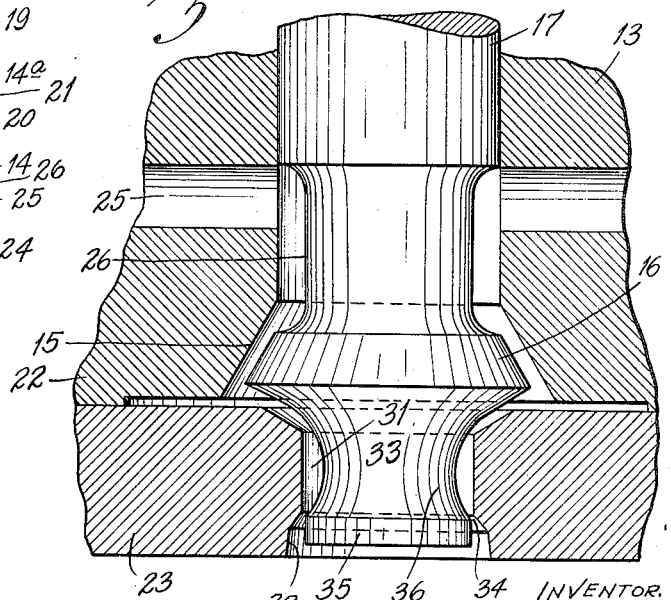

Fig. 1 is a central longitudinal section through a fuel injector embodying my invention, Fig. 2 is an enlarged fragmentary section of the discharge end or nozzle portion of said injector, with the valve closed; and Fig. 3 is a similar view showing the valve open.

My fuel injector comprises a substantially cylindrical casing or main body portion 1 provided with an axial bore or fuel passageway having a large inner end portion 2, a large outer end portion 3, a slightly smaller intermediate portion 4 and a still smaller portion 5 between the portions 2 and 4. The large inner end portion 2 of the axial bore of the body portion 1 of the injector is internally threaded to receive the threaded end portion of a stud 6, which firmly clamps a rotary inlet fitting 7 on the inner end of said body portion. This fitting is provided with a radial extension 8 that is externally threaded for connection with the usual fuel supply pipe (not shown) that leads from a suitable fuel injection pump (not shown). The radial extension 8 of the inlet fitting 7 is provided with an axial fuel passageway 9 which opens into a peripheral groove 10 in the securing stud 6; and said groove communicates through one or more radial fuel passageways 11 in said stud with an axial fuel passageway 12 therein that opens into the large stud receiving portion 2 of the axial bore or passageway of the fuel injector.

Mounted in the large outer end portion 3 of the axial bore of the main body member 1 of the fuel injector is a tubular guide member or sleeve 13 whose bore 14 is flared at its outer end to form a seat 15 for a conical valve 16 having a stem portion 17 slidably supported in said bore. The valve 16 is normally held against the seat 15 provided therefor in the outer end of the guide sleeve 13 by means of a compression coil spring 18, which surrounds the valve stem 17 between a pair of lock nuts 19 threaded thereon and a shoulder formed in the bore 14 of said sleeve by the enlarged spring receiving portion 14a of said bore. The guide sleeve is provided opposite the enlarged spring receiving portion 14a of its bore 14 with side openings 20 through which the valve closing spring 18 and adjusting nuts 19 are inserted in and removed from said sleeve.

The valve guide 13 is of smaller diameter than the large outer end portion 3 of the axial bore so as to provide an annular clearance space or passageway 21 therebetween; and said guide is provided at its outer end with a circular outstanding flange or head 22 that is firmly clamped against the outer or nozzle end of the holder by a cap nut 23 threaded thereon. The head 22 of the valve guide seats snugly within a counterbore or central circular pilot recess 24 provided therefor in the end wall of the cap nut 23 and thus accurately centers said guide in the large outer end portion 3 of the axial bore of the holder 1. The inner end of the valve guide 13 terminates short of the intermediate portion 4 of the axial bore of the holder so as to establish communication between said portion and the annular passageway 21. Said annular passageway communicates at its outer end with radial ports 25 that are formed in the valve guide 13 and open into the valve stem supporting bore thereof adjacent to the valve seat 16. The valve stem 17 is provided opposite these ports with an annular groove 26 that permits flow of the fuel between the valve stem and its supporting bore.

The inner end of the intermediate portion 4 of the axial bore of the body portion or holder 1, is provided with a conical seat 27 for an outwardly opening ball check valve 28, which is held against said seat by a coil compression spring 29 located in said intermediate portion of said bore between said valve and a seat 30 provided therefor in the inner end of the valve guide.

The nozzle cap 23 is provided with an axial discharge bore 31 having a flared outer end portion 32; and the valve 16 has a pin or pintle 33 projecting from the outer end thereof that is of smaller diameter than said bore so as to form therewith an annular discharge orifice 34. Said pin has a cylindrical outer end portion or head 35 that is connected with the valve by a reversely tapered or longitudinally concave portion 36 of reduced diameter. The cylindrical head 35 of the nozzle pin portion determines the minimum cross-section of the discharge orifice 34 and the reduced portion 36 determines the maximum cross-section thereof, while the concave surface of said reduced portion and the flared portion 32 of the axial bore 31 of the cap 23 cooperates to give the spray angle desired. By this arrangement, the fuel discharge is held to a minimum during the early part of the opening movement of the valve and gradually increases to a maximum during the remaining part of the valve opening movement, thereby preventing sudden pressure increase in the engine cylinder and giving smoothness to the running of the engine.

By the arrangement described, the pressure of the fuel in the narrow intermediate portion 4 of the axial bore of the body member 1 of the injector forces the ball check valve 28 off its seat, thereby permitting the fuel to flow outwardly through the annular space 21 between the valve guide 13 and the large outer end portion 3 of said axial bore and thence through the radial ports 25 in the outer end of said guide to the valve stem supporting bore thereof where the pressure of the fuel operates to force the valve 16 off its seat in the end of said guide and thus permit the fuel to escape through the annular discharge orifice 34 formed by the valve pin 33 and the discharge bore 31 in the nozzle cap 23. When the valve is open the conical surface is also exposed to the pressure, thereby requiring less pressure to hold the valve open than is required to open it, thereby preventing line surges which produce after dribble from the nozzle.

The hereinbefore described arrangement has several advantages. The cap nut 23 serves to accurately center the valve guide 13 in the bore of the holder and thus maintain a uniform clearance space or passageway between said guide and said bore; it also serves to accurately center the valve pin in the discharge bore and thus maintain a uniform annular clearance space therebetween; and it also prevents endwise movement of said guide without exerting endwise pressure thereon which would tend to bow said guide and thus interfere with the axial sliding movement of the valve stem therein. The shape of the valve pin and the discharge bore of the cap permits only a small quantity of fuel to be delivered at the beginning and near the end of the opening and closing movements of the valve, thereby preventing a sudden pressure increase in the engine cylinder which causes heavy running of the engine. As less pressure is required to hold the valve open, due to the additional valve surface exposed when the valve is open, the pressure is rapidly dissipated through the fully opened discharge orifice and thus permits the valve to close before a greater pressure can be built up to again open the valve with the result that the valve is caused to chatter or reciprocate rapidly and produce a rapid succession of injections which improve atomization.

What I claim is:

1. A fuel injector having a bore opening through the discharge end thereof and a fuel inlet passageway communicating with said bore, a guide member extending into said bore and spaced therefrom to form an annular fuel passageway, said guide member having an axial bore terminating at its outer end in a valve seat and a radial fuel passageway leading from said annular passageway to the bore of said guide member adjacent to said valve seat, a valve cooperating with said valve seat and having a stem reciprocable in the axial bore of said guide member with both ends supported therein, said axial bore and said valve stem being spaced apart to provide an annular space therebetween from said radial passageway to the valve seat at the outer end of said axial bore, and an apertured cap removably secured to the discharge end of said injector for holding said guide member in said bore entirely clear thereof and concentric therewith to form said annular fuel passageway.

2. A fuel injector having a cylindrical bore opening through the discharge end thereof and a fuel inlet passageway communicating with the inner end of said bore, a cylindrical guide in said bore and spaced therefrom to form an annular fuel passageway, said guide having an axial bore terminating at its outer end in a valve seat and radial fuel passageways establishing communication between said annular passageway and the bore of said guide adjacent to said valve seat, a valve cooperating with said valve seat and having a stem slidably supported at its inner end and adjacent to its outer end in the bore of said guide and provided opposite said radial passageways with an annular groove, an adjustable abutment on said valve stem, a coil compression spring sleeved on said stem between said abutment and a shoulder formed in said bore, and an apertured nozzle cap removably secured to the discharge end of said injector for holding said guide in said bore entirely clear thereof and concentric therewith.

3. A fuel injector having a bore opening through the discharge end thereof and a fuel inlet passageway communicating with said bore, a guide member extending into said bore and spaced therefrom to form an annular fuel passageway, said guide member having an axial bore terminating at its outer end in a valve seat and a radial fuel passageway leading from said annular passageway to the bore of said guide member adjacent to said valve seat, a valve cooperating with said valve seat and having a stem reciprocable in the bore of said guide member, one of said guide members and valve stem being shaped to provide an annular space therebetween opposite said radial passageway, an apertured cap removably secured to the discharge end of said injector for centering and holding said guide member in the bore thereof, the bore of said injector being provided inwardly of said guide with a valve seat, a valve cooperating with said seat, and a valve closing spring interposed between said last mentioned valve and the inner end of said guide member.

4. A fuel injector having a bore opening through the discharge end thereof, a guide mounted in said bore, said guide having an axial bore terminating at its outer end in a valve seat, a valve cooperating with said valve seat and having a stem reciprocable in the axial bore of said guide, said bore of said guide being enlarged intermediate between its ends, a nut threaded on said valve stem in the enlarged portion of the bore of said guide, and a coil compression spring sleeved on said valve stem between said nut and a shoulder formed by the enlarged portion of the bore of said guide, said guide having lateral openings therein opposite the enlarged portion of the bore thereof through which access may be made to said nut and through which said nut and said spring may be inserted in and removed from said guide.

5. A fuel injector having a cylindrical bore opening through the discharge end thereof, a cylindrical guide in said bore and spaced therefrom to form an annular fuel passageway, said guide having an axial bore terminating at its outer end in a valve seat and radial passageways establishing communication between said annular passageway and the bore of said guide adjacent to said valve seat, a valve cooperating with said valve seat and having a stem reciprocable in the bore of said guide and provided opposite said radial passageways with an annular groove, said bore of said guide being enlarged intermediate between its ends, a nut threaded on said valve stem in the enlarged portion of the bore of said guide, a coil compression spring sleeved on said valve stem between said nut and a shoulder formed by the enlarged portion of the bore of said guide, said guide having lateral openings therein opposite the enlarged portion of the bore thereof through which access may be made to said nut and through which said nut and said spring may be inserted in and removed from said guide, said guide having a flange at its outer end, and a nozzle cap threaded on the discharge end of said injector and adapted to clamp said flange thereagainst, said cap having a central recess adapted to receive said flange and center said guide in the bore of said injector.

6. A fuel injector having a cylindrical bore opening through the discharge end thereof, a cylindrical guide in said bore and spaced therefrom to form an annular fuel passageway, said guide having an axial bore terminating at its outer end in a valve seat and radial passageways establishing communication between said annular passageway and the bore of said guide adjacent to said valve seat, a valve cooperating with said valve seat and having a stem reciprocable in the bore of said guide and provided opposite said radial passageways with an annular groove, said bore of said guide being enlarged intermediate between its ends, a nut threaded on said valve stem in the enlarged portion of the bore of said guide, a coil compression spring sleeved on said valve stem between said nut and a shoulder formed by the enlarged portion of the bore of said guide, said guide having lateral openings therein opposite the enlarged portion of the bore thereof through which access may be made to said nut and through which said nut and said spring may be inserted in and removed from said guide, said guide having a flange at its outer end, and a nozzle cap threaded on the discharge end of said injector and adapted to clamp said flange thereagainst, said cap having a central recess adapted to receive said flange and center said guide in the bore of said injector, said cap having a central discharge opening therein, and said valve having an outwardly extending axial pin that extends into said discharge opening with an annular clearance space therebetween, and is provided with a reversely tapered portion of reduced diameter.

HERBERT C. EDWARDS.